United States Patent
Hill

[15] 3,656,141
[45] Apr. 11, 1972

[54] BIRD-SCATTERING DEVICE

[72] Inventor: Frank C. Hill, 3033 22nd Avenue, Oakland, Calif. 94602

[22] Filed: Jan. 23, 1970

[21] Appl. No.: 5,198

[52] U.S. Cl. ............................................340/272, 340/279
[51] Int. Cl. ......................................................G08b 13/10
[58] Field of Search ....................340/272, 279, 283; 200/85, 200/52 H

[56] References Cited

UNITED STATES PATENTS

| | | | |
|---|---|---|---|
| 674,018 | 5/1901 | Robinson | 200/85 R |
| 918,413 | 4/1909 | Anderson, Jr. | 340/272 |
| 1,037,470 | 9/1912 | Grindle | 200/85 R |
| 3,090,226 | 5/1963 | Corti et al. | 340/272 |
| 3,253,271 | 5/1966 | Trupiano et al. | 340/283 |
| 2,856,476 | 10/1958 | Kaiser et al. | 200/61.04 |

Primary Examiner—John W. Caldwell
Assistant Examiner—Glen R. Swann, III
Attorney—Joseph B. Gardner

[57] ABSTRACT

A bird-scattering device operative in response to the weight of the bird alighting thereon to provide an audible alarm effective to frighten birds in the vicinity thereof. The device includes a support casing having a chamber housing therein an electric circuit that comprises an audible alarm in series with a switch operative to complete the circuit whenever a bird alights upon the device. The switch provides as the movable element thereof a large perch normally biased into an inoperative position but displaceable into a closed alarm-energizing position effective to complete the electric circuit whenever a bird lights upon the perch.

2 Claims, 3 Drawing Figures

INVENTOR:
FRANK C. HILL
BY: Joseph B. Gardner
ATTORNEY

BIRD-SCATTERING DEVICE

This invention relates to a device operative in response to the presence of a bird to provide indicia of a character to frighten the same, and it relates more particularly to a bird-scattering device having an alarm that is energized by the weight of a bird alighting upon the device.

There are many locations at which the presence of birds and the debris and clutter caused thereby is undesirable, and an object, among others, of the present invention is to provide an improved bird-scattering device operative to frighten birds away from a location equipped with the device.

Another object of the invention is in the provision of an improved bird-scattering device that is ordinarily dormant or inoperative and is energized in response to the presence of a bird alighting thereon.

Still another object of the invention is that of providing a device of the character described which is especially useful in frightening birds to prevent the same from perching at a restricted or particular location.

Yet another object is to provide an improved bird-scattering device of the type set forth that is of simple construction, inexpensive, reliable in its operation, lightweight and portable, and that can be quickly and easily positioned at any desired location and attached thereat all without the requirement for connection to or other association with ancillary mechanism -- it being a self-contained unit.

Additional objects and advantages of the invention, especially as concerns particular features and characteristics thereof, will become apparent as the specification continues.

A bird-scattering device in accordance with the present invention includes a support structure in the form of a closed container having a chamber therewithin housing an electric circuit and the components thereof comprising a part of the device. Extending along the top wall of the support structure is a perch that overlies and substantially covers the top wall and is movable between an upper inoperative position into which it is normally biased and a lower transient or temporary alarm-energizing position into which it is displaced as a consequence of the weight of a bird perched thereupon. Such displacement of the perch completes the electric circuit that includes an alarm as a component thereof; and whenever the circuit is closed, the alarm provides an audible signal or other indicia of a character which frightens such bird supported upon the perch and any birds in the general vicinity of the device.

Embodiments of the invention are illustrated in the accompanying drawing in which.

Figure 1:
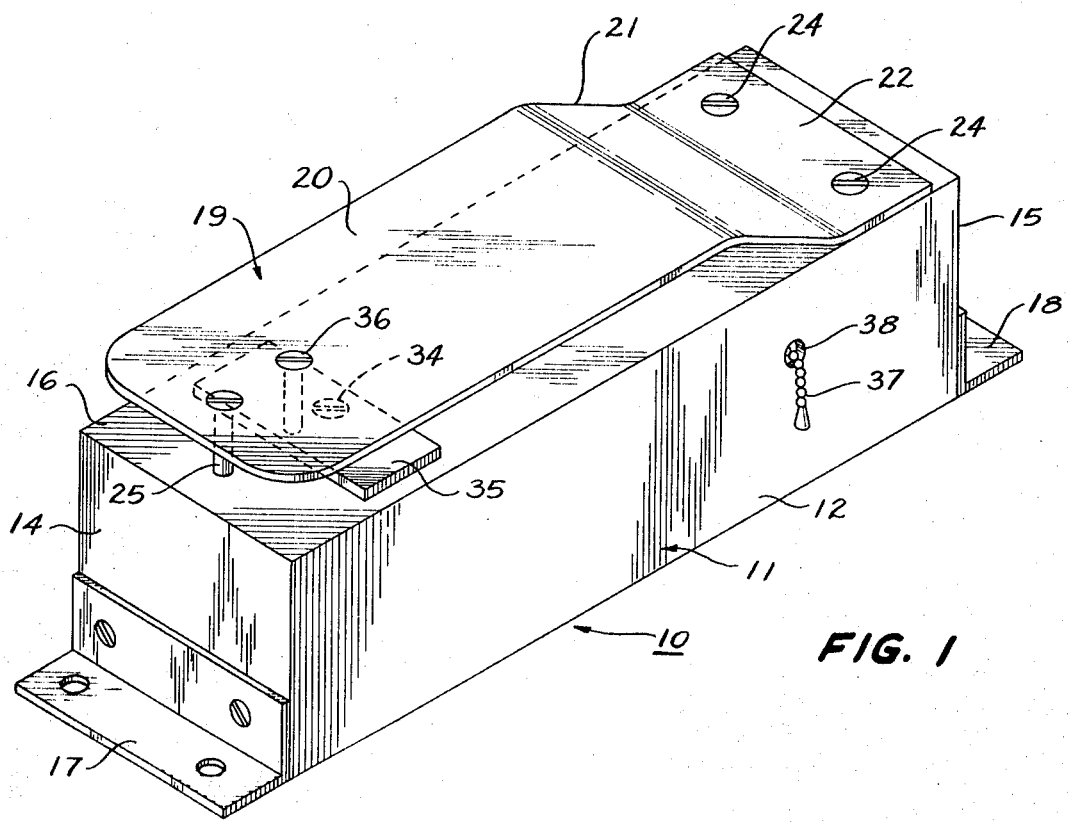
FIG. 1 is a perspective view of a device embodying the invention.

The embodiment of the bird-scattering device illustrated in FIG. 1 is denoted in its entirety with the numeral 10, and it includes support structure 11 taking the form of a generally rectangular box having a hollow interior in which the electrical components forming a part of the device are located. The casing-like support structure 11 includes spaced side walls one of which is shown and is denoted with the numeral 12, end walls 14 and 15, a top wall 16, and a bottom wall, not shown. The support structure 11 is adapted to be positioned at some location where the presence of birds is undesirable, and in this respect it may be mounted upon a porch railing, building roof, tree, mast of a ship, and so forth. The device is advantageously equipped with means to facilitate securing the same at such location, and in the form shown, L-shaped mounting brackets 17 and 18 are respectively fastened to the end walls 14 and 15 and are provided with apertures adapted to pass screw fasteners therethrough for fastening the device to some appropriate support therefor.

Figure 2:
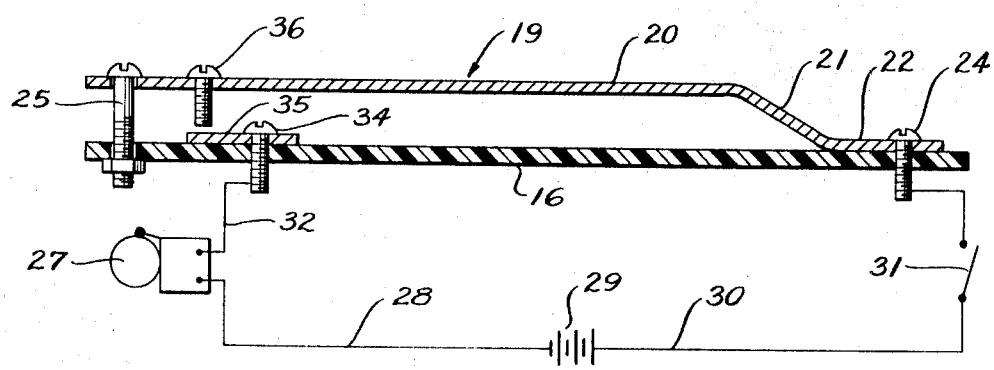
FIG. 2 is a broken longitudinal sectional view of the device with portions of the electric circuit forming a part thereof being illustrated in schematic form.

Mounted upon the top wall 16 of the support structure 11 is a perch 19 that is movable between a normal inoperative position, shown in FIGS. 1 and 2, and a transient or temporary alarm-energizing position into which it is displaceable by the weight of a bird perched thereupon. The perch 19 includes a large tongue or relatively flat section 20 that is substantially planar and is oriented in generally parallel relation with the top wall 16. The tongue 20 at one end thereof is bent downwardly and laterally so as to form a connector section 21 which at its lower end is bent or turned laterally to form a base 22 fixedly secured to the top wall 16 by a plurality of fasteners in the form of screws 24.

The perch 19 and particularly the tongue 20 thereof is resiliently biased into the upper inoperative position shown in the drawing in which the tongue is substantially parallel to the top wall 16. Such normal inoperative position can be enforced upon the tongue 20 in any suitable manner and, for example, compression spring means can be interposed between the top wall 16 and tongue 20 to urge this normal position upon the tongue. However, in the particular device being considered the perch 19 is formed of metal, light gage aluminum for example, having sufficient inherent resilience to bias the tongue in a direction away from the top wall 16. It may be observed that the perch 19 is an electric conductor forming a part of the energizing circuit for the device 10, and a material having a good electric conductivity such as aluminum is advantageously employed. It will be appreciated that the perch could be a non-conductor with separate electric conductors used to form a completed circuit when the perch is displaced downwardly into its alarm-energizing position, as will become more apparent hereinafter.

Since the perch 19 is employed as a conductor, it will be appreciated that it is most advantageous to form the support structure 11, or at least the top wall 16 thereof, of a dielectric material so that separate insulations means is not required to electrically isolate the perch 19 from the top wall 16. Accordingly, in the form shown the support structure 11 is fabricated of a plastic material having the desired insulating properties, and as an example thereof thermoplastic materials such as polystyrene and polyethelene may be used although there is no essential limitation on the particular type of material employed and other examples thereof are thermo-setting plastics, wood, resin-impregnated paper, etc.

Figure 3:
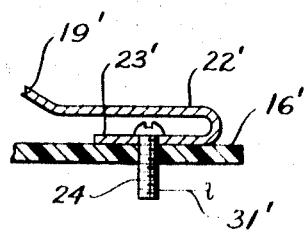
FIG. 3 is a broken longitudinal sectional view of a slightly modified construction.

It will be observed in FIG. 1 that the tongue 20 of the perch 19 essentially covers the entire top wall 16 of the device 10 so that there is almost no area therealong upon which a bird can alight other than upon the tongue 20. In order to further decrease the available area upon which a bird might alight without its deflecting the tongue 20 downwardly into the alarm-energizing position thereof, variant arrangements may be employed such as bending the base 22 in a direction such that it will extend downwardly along the end wall 15 to which it can be secured, and another variant is illustrated in FIG. 3 in which the tongue 19' has a base 22' turned under to form a U-shaped configuration having an underlying leg 23' secured to the top wall 16' of the support by a plurality of fasteners 24'. Proper selection of the gage or thickness of the material and the temper thereof from which the perch 19' is formed will enable the weight of the bird alighting upon the upper surface of the base 22' to cause the perch to be displaced downwardly into the alarm-energizing position thereof.

Stop means are provided to establish the upper inoperative position of the perch 19 by limiting the permissible upward movement enforced thereon by its inherent resilience. As shown best in FIG. 2, such stop means takes the form of a bolt 25 that extends downwardly through an opening provided therefor in the tongue 20, and at its lower end the bolt 25 is secured to the top wall 16 of the support structure 11. In the embodiment being considered, the bolt 24 extends through an opening in the top wall 16 and is equipped with a nut 26 that prevents the bolt from being withdrawn upwardly through the top wall 16.

The opening provided in the tongue 20 may be sufficiently large to enable the tongue to deflect freely without interference from the bolt 25, and in the device 10 the opening in the wall 16 is relatively large so that the bolt 25 can reciprocate therethrough upon vertical displacements of the tongue between the upper inoperative and lower alarm-energizing positions thereof. Accordingly, the weight of the bolt 25 and nut 26 serves as a counterbalance to the resilience of the perch, thereby augmenting the weight of a bird that may perch thereupon and facilitating downward displacement of the tongue into its alarm-energizing position.

The device 10 also includes a selectively operable alarm carried by the support structure 11 within the interior of the compartment defined thereby. The alarm is illustrated in FIG. 2 and denoted with the numeral 27, and in the operative condition thereof it is effective to provide indicia of a character to frighten birds including any bird alighting upon the perch 19 and those birds in the general vacinity of the device. In the particular embodiment being considered, the alarm 27 is an electrically energized audible alarm in the form of a bell or buzzer that is normally inoperative or deenergized but is made operative upon downward displacement of the perch 19 in response to the weight of a bird alighting on the tongue 20 thereof. The audible alarm 27 may be completely conventional, and may be of a type energized by a low voltage dc source, as explained hereinafter.

Means are provided interconnecting the perch 19 and alarm 27 for actuating the latter in response to displacement of the perch 19 into the lower alarm-energizing position thereof. Such means in the device being considered comprises an electric circuit, shown in FIG. 2, which includes a conductor 28 connecting one side of the alarm 27 to the negative terminal of a battery 29 (the polarity of the battery can be reversed). The positive terminal of the battery 29 is connected by a conductor 30 via a main on-off or control switch 31 to one of the aforementioned fasteners 24 which is in both mechanical and electrical connection with the perch 19 at the base end 22 thereof. The opposite side of the alarm 27 is connected by a conductor 32 to a bolt-type fastener 34 that mechanically secures a contact plate 35 to the top wall 16 along the upper surface thereof.

The fastener 34 is also an electrical connection with the contact plate 35 so as to establish an electric circuit from it to the connector 32 and alarm 27. A terminal 36 in the form of a screw extends downwardly through the tongue 20 of the perch 29 and is both mechanically and electrically connected therewith. The terminal 36 is in alignment with the contact plate 35 and is adapted to engage the same upon downward displacement of the perch into its alarm-energizing position. Accordingly, the perch 19 together with the terminal 36 and contact plate 35 defines a normally open switch adapted to be closed so as to complete the electric circuit through the alarm 27 whenever the weight of a bird bears downwardly on the tongue 20 so as to deflect the same downwardly, thereby causing the terminal 26 to make electric contact with the plate 35.

The capacity of the battery 29 will depend upon the electrical requirements of the alarm 27, but by way of example, in one specific embodiment of the device the battery 29 constitutes two serially connected one and one-half volt flashlight batteries. The switch 31 may be any conventional on-off switch, and it is used to prevent operation of the device 10 should this be desired. As shown in FIG. 1, the switch 31 may be a chain-type pull switch having a chain 37 extending outwardly through an opening 38 provided therefor in the side wall 12 of the support structure 11 to enable the switch to be manually manipulated without the necessity of access into the interior of the support structure.

Use and operation of the device 10 will be apparent from the foregoing description, but for purposes of summary it may be observed that the device is simply positioned at some location where the presence of birds is undesirable. The device may be semi-permanently secured at such location by means of screw fasteners (not shown) extending through openings provided therefor in the brackets 17 and 18. Assuming a suitable battery 29 is in a position and the switch 31 is closed, the energizing circuit for the alarm 27 will be completed whenever a bird alights upon the perch 19 so as to displace the same downwardly into the alarm-energizing position thereof in which the terminal 36 makes contact with the plate 35. At this time, a circuit will be completed from the battery 29 through the conductor 30, switch 31 fastener 24, perch 19, terminal 36, contact plate 35, fastener 34, conductor 32, alarm 27, and conductor 28 to the battery 29.

Energization of the alarm 27 provides a loud audible signal which not only frightens away the particular bird that alighted upon the perch 19 but those birds in the immediate vicinity of the device. Such operation and function of the device is repeated each time that a bird alights upon the perch 19 so long as the control switch 31 is closed. Should it be desired to prevent operation of the device 10, it is only necessary to pull the chain 37 (which may be as long as required) so as to displace the switch 31 into the open position thereof.

If desired, the perch 19 may be of a character tending to attract birds in the immediate vicinity thereof to that any such bird will be attracted to and alight upon the perch 19 rather than simply seek some other perch in the near vicinity of the device 10. In this respect, it is known that light colors and shiny objects tend to attract birds, and the perch 19 may be painted or otherwise provided with a light color along the upper surface thereof, or in the case of the perch being formed of aluminum the upper surface thereof may be polished or the metallic finish itself may be sufficiently shiny to attract birds thereto.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A device for scattering birds, comprising support structure, a selectively operable electrically energizable alarm carried by said support structure and being effective in the operative condition thereof to provide sound of a character to frighten birds and thereby scatter the same, a perch mounted upon said support structure for movement between an upper inoperative position and a lower transient alarm-energizing position and being displaceable downwardly into the latter position in response to the weight of a bird perched thereupon, and normally open electric circuit means including said alarm as an element thereof and being interconnected with said perch so as to be closed thereby and actuate said alarm in response to downward displacements of said perch into the alarm-energized position thereof, said perch being substantially coextensive in size with said support structure so that any bird attempting to alight upon said device will be forced to alight upon said perch, and said perch adjacent one end thereof being turned upon itself into a generally U-shaped configuration to provide an underlying end portion secured to said support structure and defining an integral spring, said perch having sufficient inherent resilience to be self-biased by said spring into such upper inoperative position in the absence of the weight of a bird thereon and to swing downwardly into such lower alarm-energizing position against the biasing force of said spring under the weight of a bird.

2. The device of claim 1 in which said perch comprises an electric conductor forming the movable component of a normally open switch included in said circuit and closed to complete the same upon downward displacement of said perch into the lower alarm-energizing position thereof.

* * * * *